(12) United States Patent
Cai et al.

(10) Patent No.: US 9,156,978 B1
(45) Date of Patent: Oct. 13, 2015

(54) LOW SOFTENER HALOGEN FREE FLAME RETARDANT STYRENIC BLOCK COPOLYMER-BASED THERMOPLASTIC ELASTOMER COMPOSITIONS

(71) Applicant: TEKNOR APEX COMPANY, Pawtucket, RI (US)

(72) Inventors: Kevin Cai, Cumberland, RI (US); Roland Ruprecht, Sutton, MA (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 0 days.

(21) Appl. No.: 14/297,900

(22) Filed: Jun. 6, 2014

(51) Int. Cl.
| | |
|---|---|
| *C08K 5/49* | (2006.01) |
| *C08K 5/53* | (2006.01) |
| *C08L 53/00* | (2006.01) |
| *C08L 23/16* | (2006.01) |
| *H01B 3/44* | (2006.01) |

(52) U.S. Cl.
CPC ............... *C08L 53/00* (2013.01); *C08L 23/16* (2013.01); *H01B 3/442* (2013.01)

(58) Field of Classification Search
CPC .......... C08L 53/00; C08L 23/16; H01B 3/442
USPC ........................................................ 524/115
See application file for complete search history.

(56) References Cited

U.S. PATENT DOCUMENTS

| | | | | |
|---|---|---|---|---|
| 7,169,848 | B2 * | 1/2007 | Bening et al. | 525/88 |
| 7,622,522 | B2 * | 11/2009 | Qiu et al. | 524/100 |
| 2005/0171290 | A1 | 8/2005 | Bening et al. | |
| 2010/0122845 | A1 | 5/2010 | Guo et al. | |
| 2012/0037396 | A1 | 2/2012 | Gu | |
| 2012/0108713 | A1 | 5/2012 | Ewald et al. | |
| 2012/0261163 | A1 | 10/2012 | Tai et al. | |
| 2013/0065051 | A1 * | 3/2013 | Chen et al. | 428/375 |

FOREIGN PATENT DOCUMENTS

| | | |
|---|---|---|
| WO | 2010126855 A1 | 11/2010 |
| WO | 2013029249 A1 | 3/2013 |

OTHER PUBLICATIONS

International Search Report dated Jul. 24, 2015.

* cited by examiner

*Primary Examiner* — Hui Chin
(74) *Attorney, Agent, or Firm* — Hudak, Shunk & Farine Co. LPA

(57) ABSTRACT

Halogen free flame retardant thermoplastic elastomer compositions including a hydrogenated styrenic block copolymer having relatively high styrene or mono alkenyl arene content and styrene or mono alkenyl arene in each block. Surprisingly, the compositions contain low amounts or are free of plasticizing softeners. The compositions include a blend of non-halogen flame retardants including a liquid phosphorous-containing component and a solid secondary component. The compositions are suitable for extrusion or molding and are useful for films or wire and cable applications.

16 Claims, 1 Drawing Sheet

LOW SOFTENER HALOGEN FREE FLAME RETARDANT STYRENIC BLOCK COPOLYMER-BASED THERMOPLASTIC ELASTOMER COMPOSITIONS

FIELD OF THE INVENTION

The present invention relates to halogen free flame retardant thermoplastic elastomer compositions including a hydrogenated styrenic block copolymer having relatively high styrene or mono alkenyl arene content and styrene or mono alkenyl arene in each block. Surprisingly, the compositions contain low amounts or are free of plasticizing softeners. The compositions include a blend of non-halogen flame retardants including a liquid phosphorous-containing component and a solid secondary component. The compositions are suitable for extrusion or molding and are useful for films or wire and cable applications.

BACKGROUND OF THE INVENTION

Wire and cable coverings, sheathes, jackets, and films exhibiting desirable flame retardant performance are sought in the industry. Customers often require or demand compositions meet minimum standards such as the Underwriters' Laboratory (UL) 94 VB Test, with a VO rating at a specified thickness. In addition, film or wire and cable producers require extrudable compositions for some applications. Most styrenic block copolymer-based thermoplastic elastomer (TPE) compositions require the use of a mineral oil as a plasticizing softener. Without the plasticizing softener, the flame retardant containing TPE compositions can be difficult to process and extrude. However, the use of a softener can significantly reduce the flame retardant performance of such compositions.

U.S. Patent Application publication 2013/0065051 A1 relates to halogen-free, flame-retardant thermoplastic compositions that include a styrenic block copolymer, a low-melting, phosphorus-based flame retardant having a melting temperature no higher than 170° C., and a blend of solid intumescent phosphorus and nitrogen-containing flame retardants. The blend of solid intumescent flame retardants include at least two phosphorous and nitrogen-containing phosphoric acid salts that reportedly synergistically enhance the flame-retardant properties of the compositions relative to compositions that include other flame-retardant packages.

U.S. Patent Application publication 2012/0261163 A1 disclose a halogen-free, flame retardant thermoplastic resin composition based on polypropylene and one or more thermoplastic elastomers with an organic nitrogen- and/or phosphorus-based intumescent flame retardant comprising a piperazine component. The composition is processed easily to make a wire and cable sheath reportedly exhibiting a balance of high flame retardancy, good flexibility, high wet electrical resistance and excellent heat deformation properties, and which reportedly passes the VW-I flame retardancy test, the US1581 heat deformation test at 150° C., and the wet electrical resistance test, and also exhibits good tensile and flexibility properties. Also disclosed is a wire and cable sheath made from the composition.

In view of the above, one problem of the present invention was to provide extrudable thermoplastic elastomer compositions that are halogen-free and exhibit excellent flexibility and flame retardant performance. Still another problem of the present invention was to provide thermoplastic elastomers having low or no mineral oil softener content, yet remain easily processable and extrudable.

Another problem of the present invention was that mineral oils typically utilized to make styrenic block copolymer-based halogen free flame retardant thermoplastic elastomers processable can significantly reduce the flame retardancy performance. Simply replacing the mineral oil with a liquid flame retardant can cause the liquid flame retardant to leach out of the processed, e.g. molded or extruded, composition leading to surface tackiness. The use of a relatively low styrene content styrenic block copolymer allows the use of softener free compositions, although flexibility and physical strength of the thermoplastic elastomer can be poor.

SUMMARY OF THE INVENTION

The noted problems and others are solved by the present invention which provides halogen-free flame retardant compositions, wherein the inclusion of a hydrogenated or saturated styrenic block copolymer comprising at least three blocks with styrene or mono alkenyl arene present in each block, preferably a majority of the monomers of the end blocks and a minority of the monomers in the one or more mid-blocks; and the inclusion of a liquid phosphorous-containing flame retardant allow for the use of little or no softener such as mineral or vegetable oil, yet surprisingly, the compositions are easily processable and can be extruded, for example into wire and cable coverings, jacketing, sheathing, films. The styrenic block copolymer has relatively high styrene content or mono alkenyl arene and the styrene or mono alkenyl arene present in the mid-block(s) can be arranged randomly or in a controlled distribution.

Yet another object of the present invention is to provide a flame retardant composition comprising a styrenic block copolymer with relatively high styrene or mono alkenyl arene content of greater than about 38 wt. %, with styrene or mono alkenyl arene monomer located in a mid-block as well as the end blocks of the block copolymer.

An additional object of the present invention is to provide a flame-retardant composition comprising a synergistic combination of liquid and solid flame retardants that are halogen-free, wherein the liquid flame retardant is a phosphorus-containing additive, preferably a phosphate ester. The liquid flame-retardant is typically polar and generally not compatible with typical styrenic block copolymers. Surprisingly, the combination of the solid flame retardant and styrenic block copolymer with high styrene content and styrene also in the elastomer or soft block makes the liquid flame retardant-containing composition relatively very stable and easily processable.

An additional object of the present invention is to provide flame-retardant compositions that pass the UL 94 VB test with a V-0 rating at one or more different thicknesses, and especially at a relatively low thickness.

A further object of the present invention is to provide a halogen-free flame-retardant thermoplastic elastomer composition having low melt viscosity that can be extruded into a product having a smooth surface.

In one aspect of the present invention, a flame-retardant thermoplastic elastomer composition is disclosed, comprising a hydrogenated styrenic block copolymer having a styrene content of at least 38 wt. %, the styrenic block copolymer comprising at least three different blocks with styrene being present within each block, wherein each end block of the styrenic block copolymer comprises greater than 50% by weight of styrene; a first non-halogen flame retardant that is phosphorous-containing liquid and present in an amount from about 5 to about 35 wt. % based on the total weight of the composition; and a second polymer in an amount from about 5 to about 65 wt. % based on the total weight of the composition.

As utilized herein, the terms "liquid" and "solid" refer to a component at a room temperature of 23° C. The terms "hydrogenated" or "saturated" refer to styrenic block copolymers wherein at least 80%, 90% or 95% or substantially all of the conjugated diene double bonds have been reduced. "Halogen-free" and like terms mean that the compositions of the invention are without or substantially without halogen content, i.e., contain <2000 mg/kg of halogen as measured by ion chromatography (IC) or similar analytical method. Halogen content of less than this amount is considered inconsequential to the efficacy of the composition as a wire or cable covering. The terms "aromatic vinyl", "styrene" and "mono alkenyl arene" are to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other mono alkenyl polycyclic aromatic compounds such as vinyl naphthalene, vinyl anthracene and the like.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
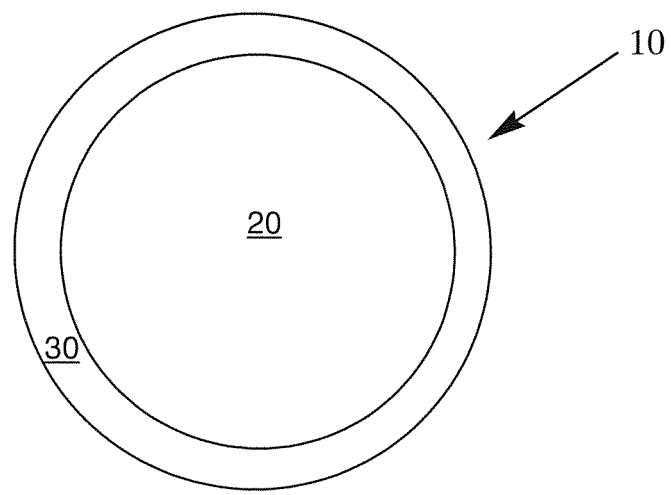
FIG. 1 illustrates a cross-sectional view of a wire or cable with a core having an extruded cover thereon comprising a composition of the present invention.

Thermoplastic elastomer compositions of the present invention include a hydrogenated styrenic block copolymer of at least three blocks having styrene or a monoalkenyl arene present in each block, wherein one or more mid-blocks containing the styrene or monoalkenyl arene can be arranged randomly or have a controlled distribution copolymer block that comprises terminal regions adjacent relatively harder blocks, with the controlled distribution block being rich in conjugated dienes adjacent to the relatively hard blocks and one or more regions not adjacent to the relatively hard blocks that are rich in monoalkenyl arene units, and at least two non-halogen flame retardants with one of the flame retardant components being a phosphorus-containing liquid, preferably a phosphate ester, and the second being a solid component. Surprisingly, the inventive compositions comprise low amounts of softeners such as mineral oil or vegetable oil and are yet extrudable and moldable with desirable surface smoothness. The compositions are suitable for wire, cable, molding and film applications.

Styrenic Block Copolymers with Styrene or Mono Alkenyl Arene in Each Block

The compositions of the present invention include one or more hydrogenated styrenic block copolymers having styrene present in each block. In a preferred embodiment, the styrenic block copolymers have a relatively hard block (A) including aromatic vinyl or mono alkenyl arene repeat units and at least one relatively soft polymer block (B) containing two or more repeat units, that are the same or different, and independently derived from diene or olefin monomers and styrene monomers. The styrenic block copolymer can be, for example, a triblock copolymer (A-B-A); or a tetrablock or higher multiblock copolymer. In a preferred embodiment, the styrenic block copolymer is a triblock copolymer (A-B-A) having two hard blocks.

The number average molecular weight and distribution of any type of styrenic block copolymer (SBC) described in this application are measured by gel permeation chromatography (GPC). The SBC is dissolved in a suitable solvent, such as THF, (typically 0.001-0.010 wt. %), and an appropriate quantity is injected into a GPC device. One suitable GPC device is available from Waters of Milford, Mass. as a Waters Breeze Dual Pump LC. The GPC analysis is performed at an appropriate elution rate (1 to 10 mL/min). The molecular weight distribution is characterized by the signals from UV and refractive index detectors, and number average molecular weights are calculated using a calibration curve generated from a series of narrow molecular weight distribution polystyrenes with peak molecular weights of 500 to 1,000,000 as standard.

Each hard polymer block (A) can have two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are aromatic vinyl compound homopolymer blocks in one embodiment. The preferred aromatic vinyl compounds are monovinyl monocyclic aromatics, such as styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer block (A). Examples of other copolymerizable monomers include, but are not limited to, 1-butene, pentene, hexene, conjugated dienes such as butadiene or isoprene, methyl vinyl ether, and other monomers.

The soft polymer block (B) of the styrenic block copolymer, in addition to styrene or mono alkenyl arene monomers, includes two or more same or different structural units. Soft polymer block (B) can be derived from olefin monomers generally having from 2 to about 12 carbon atoms and can include, for example, ethylene, propylene, butylene, isobutylene, etc. When the soft polymer block (B) has structural units derived from three or more repeat units, the structural units may be combined in any form such as random, tapered, block or any combination thereof. In one embodiment, the soft polymer block does not contain any unsaturated bonds.

In additional embodiments of the present invention, the styrenic block copolymer can have at least one soft polymer block (B) including two or more repeat units that are the same or different, independently derived from one or more of an olefin monomer and a diene monomer. When the diene monomer is present, the styrenic block copolymer is preferably hydrogenated or substantially hydrogenated. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3- hexadiene, and the like. Therefore, in one embodiment, the soft polymer block (B) can have structural units derived from one or more styrene or mono alkenyl arene monomers, and/or one or more of an olefin monomer(s) and diene monomer(s). When the soft polymer block (B) has structural units derived from three or more repeat units, the structural units may be combined in any form.

The styrenic block copolymers may be prepared utilizing bulk or solution or other techniques as known in the art.

The soft polymer block (B) includes relatively small amounts of structural units derived from other copolymerizable monomers in addition to the one or more of an olefin and diene monomers or structural units described. The proportion of the other copolymerizable monomers are generally 30% by weight or less, and preferably 10% by weight or less based on the total weight of the soft polymer block (B) of the styrenic block copolymer.

Optionally, the styrenic block copolymer can be a functionalized styrenic block copolymer such as an acid or anhydride functionalized block copolymer, such as prepared by grafting an acid moiety or its derivative into the styrenic block copolymer via a free radically initiated reaction. Examples of suitable monomers which may be grafted include unsaturated mono and polycarboxylic acids and anhydrides containing from about 3 to about 10 carbon atoms. Examples of such monomers are fumaric acid, itaconic acid, citraconic acid, acrylic acid, maleic anhydride, itaconic anhydride, and citraconic anhydride, or the like. Suitable functionalized styrenic block copolymers generally contain from about 0.1 to about 10 percent by weight, preferably from about 0.2 to about 5 percent by weight of the grafted monomer, based on the total weight of the styrenic block copolymer. Grafting reactions can be carried out in solution or by melt mixing the base block copolymer and the acid/anhydride monomer in the presence of a free radial initiator, such as known in the art, see for example U.S. Pat. No. 6,653,408, herein fully incorporated by reference.

A) Random Styrenic Block Copolymers

In various embodiments, the hydrogenated styrenic block copolymers including styrene or mono alkenyl arene in a soft polymer block (B) along with one or more of the olefin monomers and diene monomers have said blocks that are formed in a random manner. Non-limiting examples of styrenic block copolymers having styrene or monoalkenyl arene randomly distributed in a soft polymer block (B) are set forth in U.S. Pat. Nos. 6,031,053 and 6,197,889. Hydrogenation can be performed as known to those of ordinary skill in the art.

B) Controlled Distribution Copolymer Block-Containing Styrenic Block Copolymers

The hydrogenated controlled distribution block-containing styrenic block copolymers utilized in the invention have at least a first block of styrene or a mono alkenyl arene, and a second block of a controlled distribution copolymer of diene and styrene or mono alkenyl arene. Thus, the block copolymers can be any di- or higher block copolymers. In the case of a di-block copolymer composition copolymer, one block is an alkenyl arene-based block and polymerized therewith is a second block of the controlled distribution copolymer comprising diene and alkenyl arene. Tri-block or higher multi-block copolymers include at least one alkenyl arene-based block and at least one controlled distribution copolymer block comprising diene and alkenyl arene. In one preferred embodiment, the triblock-composition comprises, as end blocks, alkenyl arene-based blocks and a mid-block of a controlled distribution copolymer comprising diene and alkenyl arene. Where a tri-block copolymer composition is prepared, the controlled distribution copolymer block can be designated as "B" and the alkenyl arene-based block designated as "A". The A-B-A tri-block compositions can be made by either sequential polymerization or coupling. In one embodiment, in the sequential solution polymerization technique, the mono alkenyl arene is first introduced to produce a relatively hard aromatic-containing block, followed by introduction of the controlled distribution diene and alkenyl arene-containing mixture to form the mid-block, and then followed by introduction of the mono alkenyl arene to form the terminal block.

In one embodiment, a method for making a controlled distribution copolymer block-containing styrenic block copolymer is set forth in U.S. Pat. No. 7,169,848 herein incorporated by reference. As utilized herein, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% the average amount. Prior to hydrogenation the styrene in the rubber block portion is copolymerized and incorporated in a controlled distribution having terminal regions that are rich in diene units (e.g. butadiene, isoprene, or a mixture thereof) and a center region that is rich in styrene units. Such polymers were hydrogenated under standard conditions such that greater than 95% of the diene double bonds in the rubbery block have been reduced. The process for producing a selectively hydrogenated styrene block copolymer is described in U.S. Pat. No. 7,169,848 to Bening et al.

The styrene blockiness is simply the percentage of blocky styrene to total styrene units:

Blocky %=100 times(Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10. In a preferred embodiment of the present invention, the subject controlled distribution copolymer block has two distinct types of regions—conjugated diene rich regions on the end of the block and a mono alkenyl arene rich region near the middle or center of the block. What is desired is a mono alkenyl arene-conjugated diene controlled distribution copolymer block, wherein the proportion of mono alkenyl arene units increases gradually to a maximum near the middle or center of the block and then decreases gradually until the polymer block is fully polymerized.

The alkenyl arene can be styrene, alpha-methylstryene, para-methylstyrene, vinyl toluene, vinylnaphthalene, or para-butyl styrene or mixtures thereof. Of these, styrene is most preferred and is commercially available, and relatively inexpensive, from a variety of manufacturers. The conjugated dienes for use herein comprise 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred.

For the controlled distribution or B block the weight percent of mono alkenyl arene in each B block is between about 10 weight percent and about 75 weight percent, preferably between about 25 weight percent and about 50 weight percent for selectively hydrogenated polymers.

It is preferred that, to ensure significantly elastomeric performance while maintaining desirably high Tg and strength properties, as well as desirable transparency, the tri-block and multi-block polymer's alkenyl arene content is greater than about 20% weight, preferably from about 20% to about 80% weight. This means that essentially all of the remaining content, which is part of the diene/alkenyl arene block, is diene. It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5,000 to 45,000 for the A block and 50,000 to about 250,000 for the B block. For the triblock, which may be a sequential ABA or coupled $(AB)_2 X$ block copolymer, the A blocks should be 3,000 to about 60,000 preferably 5,000 to about 45,000, while the B block for the sequential block should be about 30,000 to about 300,000 and the B blocks (two) for the coupled polymer half that amount. The total average molecular weight for the triblock copolymer should be from about 40,000 to about 400,000 and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements, and are expressed as number average molecular weight.

The controlled distribution block copolymer is hydrogenated in various embodiments. One preferred hydrogenation is selective hydrogenation of the diene portions of the final block copolymer alternatively both the "B" blocks and the "A" blocks may be hydrogenated, or merely a portion of the "B" blocks may be hydrogenated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. No. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A, AND III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner, the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831. All of the patents mentioned in this paragraph are incorporated by reference into this application.

The controlled distribution block copolymer of the present invention may include the copolymers sold under the trade name Kraton A® by Kraton Polymers, wherein Kraton A1536 and A1535 are examples.

In various embodiments of the invention, the styrene or mono alkenyl arene is present in a total weight in an amount of greater than 38% and preferably greater than 45% based on the total weight of the random or controlled distribution styrenic block copolymer. In various embodiments the soft or (B) block of the random or controlled distribution copolymer block has a mono alkenyl arene content of less than 30%, desirably less than 29% by weight.

In various embodiments of the invention, the random block and/or controlled distribution block-containing hydrogenated styrenic block copolymers are utilized in compositions of the present invention in an amount from about 5 to about 50 wt. %, desirably from about 10 or about 15 to about 50 wt. %, and preferably from about 20 to about 30 or 35 wt. % based on the total weight of the composition (100 wt. %).

Liquid, Phosphorus-Containing Flame Retardant

The compositions of the present invention include a liquid, phosphorus-containing flame retardant. It has been surprisingly found that the liquid, phosphorus-containing flame retardants have excellent compatibility with the relatively high styrene content styrenic block copolymers utilized in the present invention, especially in the presence of a solid flame retardant. Additionally surprising is that the liquid flame-retardant allows the compositions to contain low amounts of or no softener, namely mineral oil, vegetable oil or a synthetic resin softener.

Preferably, the liquid, phosphorus-containing flame retardants are phosphate esters. Phosphate esters include aromatic and aliphatic phosphate esters and their oligomers and polymers. Examples of aliphatic phosphate ester flame retardants include trimethyl phosphate, tributyl phosphate, tri(2-ethylhexyl)phosphate, tributoxyethyl phosphate, monoisodecyl phosphate and 2-acryloyloxyethylacid phosphate. Examples of aromatic phosphate esters include trixylenyl phosphate, tris(phenylphenyl)phosphate, trinaphthyl phosphate, cresyldiphenyl phosphate, xylenyl diphenyl phosphate, 2-ethylhexyl diphenyl phosphate, phosphoric acid dodecyl ester diphenyl ester, and dipheny-2-methacryloyloxyethyl phosphate. Examples of aromatic bis(phosphate esters) include resorcinol his (diphenyl phosphate), resorcinol bis(dixylenyl phosphate), resorcinol bis(dicresylphosphate), hydroquinone bis(dixylenyl phosphate), bisphenol-A bis(diphenyl phosphate) and tetrakis(2,6-dimethylphenyl) 1,3-phenylene bisphosphate. Preferred phosphate esters in one embodiment include disphenyl-A bis(diphenyl phosphate), 2-ethylhexyl diphenyl phosphate, and resorcinol bis(diphenyl phosphate). The liquid, phosphorus-containing flame retardants are free of halogen atoms.

The liquid, phosphorus-containing flame retardants are utilized in the present invention in an amount generally from about 5 to about 35 wt. %, desirably from about 5 to about 20 wt. %, and preferably from about 5 to about 10 wt. % based on the total weight of the composition (100 wt. %). Surprisingly, relatively high amounts of liquid flame retardant can be utilized without the liquid leaching from the processed compositions.

Liquid, phosphorus-containing flame retardants are available from sources such as Adeka Palmarole or Amfine Chemical Corporation (U.S.) as FP-600, and ICL-IP as Fyrol BDP.

Solid Non-Halogen Flame Retardants.

The compositions also include at least one solid non-halogen-containing flame retardant. Solid flame retardants include for example, phosphorus-containing flame retardants, nitrogen-containing flame retardants, melamine derivatives, metal hydroxides, metal hydrates, expandable graphite, and organo-layered silicates.

Various solid phosphorus-containing flame retardants include phosphates, pyrophosphates, metaphosphates, and polyphosphates. Nitrogen and phosphorus-containing flame retardants include melamine phosphate, melamine pyrophosphate, melamine orthophosphate, monoammonium phosphate, diammonium phosphate, ammonium pyrophosphate, phosphoric acid amide, melamine polyphosphate, ammonium polyphosphate, piperazine polyphosphate, and polyphosphoric acid amide.

Other solid halogen-free flame retardants include inorganic flame retardants, for example metal hydrates such as aluminum hydrate and magnesium hydrate, metal hydroxides such as magnesium hydroxide and aluminum trihydroxide (ATH), metal oxides such as titanium dioxide, silica, alumina, bentonite clay, herctorite clay, montmorillonite clay, expandable graphite, huntite, antimony trioxide, potassium oxide, zirconium oxide, zinc oxide and magnesium oxide.

The solid, non-halogen flame retardants are present in an amount greater than 10 wt. % based on the total weight of the composition (100 wt. %) and generally from about 10 to about 65 wt. %, desirably from about 15 to about 62 wt. %, and preferably from about 20 to about 45 wt. %.

The solid, non-halogen-containing flame retardants are available from many commercial sources. A blend of piperazine pyrophosphate and melamine pyrophosphate are available as FP-2100J from Adeka Palmarole or Amfine Chemical Corporation. Polyphosphonate homopolymers and copolymers are available as FRX 100 and FRX CO35 from FRX Polymers. Various flame retardants are also available, such as Exolit from Clariant and Budit from Budenheim.

Polyolefins

In one embodiment, the compositions of the present invention optionally include one or more polyolefins, which as utilized herein are defined as one or more of a polyolefin polymer and a polyolefin copolymer, unless otherwise indicated. Polyolefins suitable for use in the compositions of the present invention comprise amorphous or crystalline homopolymers or copolymers of two or more same or different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low-density polyethylene, high-density polyethylene, linear-low-density polyethylene, polypropylene (isotactic and syndiotactic), ethylene/propylene copolymers, and polybutene. Polyolefin copolymers can also include the greater part by weight of one or more olefin monomers and a lesser amount of one or more non-olefin monomers such as vinyl monomers including vinyl acetate, or a diene monomer, etc. Polar polyolefin polymers include ethylene acrylate and ethylene vinyl acetate, for example. In a preferred embodiment, EVA is utilized that has a vinyl acetate content of greater than 5 percent. Generally, a polyolefin copolymer includes less than 40 weight percent of a non-olefin monomer, desirably less than 30 weight percent, and preferably less than about 10 weight percent of, or does not contain a non-olefin monomer.

In a further embodiment, the polyolefin can include at least one functional group per chain or can be a blend of non-functionalized polyolefins and functionalized polyolefins. Functional groups can be incorporated into the polyolefin by the inclusion of for example, one or more non-olefin monomers during polymerization of the polyolefin. Examples of functional groups include, but are not limited to, anhydride groups such as maleic anhydride, itaconic anhydride and citraconic anhydride; acrylates such as glycidyl methacrylate; acid groups such as fumaric acid, itaconic acid, citraconic acid and acrylic acid; epoxy functional groups; and amine functional groups. Functional group-containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as LOTADER®. Acid modified polyethylenes are available from DuPont as FUSABOND®.

Polyolefin polymers and copolymers are commercially available from sources including, but not limited to, Chevron, Dow Chemical, DuPont, ExxonMobil, Huntsman Polymers, Ticona and Westlake Polymer under various designations.

When present, the polyolefins range in an amount generally from about 5 to about 65 parts, desirably from about 10 to about 40 parts, and preferably from about 10 to about 30 parts by weight based on 100 total parts by weight of the total composition.

Other Polymers

In various embodiments, other polymers can be added to the compositions of the present invention in amounts stated for the polyolefins, provided that such polymers do not interfere with the desired performance of the compositions and constructions formed therewith. Examples of additional polymers include, but are not limited to, polyamide such as nylon, acrylonitrile-butadiene-styrene copolymers (ABS), acrylonitrile ethylene styrene (AES), styrene acrylonitrile copolymer (SAN), halogenated polymers such as polyvinyl chloride, polycarbonates, acrylic polymers, PET, PBT, polyesters, TPU (including TPU with a bio based polyester block), polyether-block-amide (PEBA), polyphenylene ether (PPE), and polylactic acid (PLA). In one embodiment, the compositions of the present invention further include a polar polymer comprising one or more of ethylene vinyl acetate, maleated polyolefin, maleated sytrenic block copolymer, maleated EPDM, acrylic polymer, and maleic anhydride/olefin copolymer, and wherein the polar polymer is present in an amount from about 1 to about 10 wt. % based on the total weight of the composition (100 wt. %).

Additives

The compositions of the present invention may include additional additives including, but not limited to light stabilizers, antioxidants, other non-halogen flame retardant additives, pigments, peroxides, heat stabilizers, processing aids, mold release agents, flow enhancing agents, nanoparticles, foam agents, platelet fillers and non-platelet fillers. Examples of fillers for use in the compositions include, but are not limited to, one or more of calcium carbonate, talc, clay, zeolite, silica, titanium dioxide, carbon black, barium sulfate, mica, glass fibers, whiskers, carbon fibers, magnesium carbonate, glass powders, metal powders, kaolin, graphite, and molybdenum disulfide. Suitable fillers include bio-based fillers, e.g. various fibers, cellulose, and/or lignin. In one embodiment, the compositions of the present invention comprise a platelet filler comprising one or more of nanoclay, an organically modified clay, talc and mica in the amount of 0.5 to 5 wt. % based on the total weight of the composition (100 wt. %).

Softeners.

In various embodiments, the compositions of the present invention are free of a softener that, as utilized herein, refers to a mineral oil, synthetic resin softener and vegetable oil. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". Examples of synthetic resin softeners include, but are not limited to, polyisobutylene, polybutenes and GTL oil, available from Shell. It has been found that mineral oil softeners reduce flame retardant performance due to high flammability of the mineral oil in some styrenic block copolymer based halogen-free flame retardant compositions. When present, the softeners range in an amount from 1 to 10 wt. %, and preferably from 2 to 5 wt. % based on the total weight of the composition. In additional embodiments, the compositions contain less than 9 wt. %, less than 7 wt. %, less than 5 wt. %, less than 3 wt. %, or less than 1 wt. % of the softener based on the total weight of the composition.

Compositions of the present invention can be produced utilizing any of numerous processes known in the art including, but not limited to extrusion, injection molding, compression molding, and calendaring.

The compositions of the present invention can be utilized to form a variety of articles or parts of articles such as, but not limited to, jackets, insulation, sheaths, strain relief, combo box, coverings, films, extruded profiles and tubes, conduit, etc.

FIG. 1 illustrates one embodiment of a composite 10 which comprises a core 20 including a thermoplastic elastomer composition 30 of the present invention connected to and/or in contact with the core. The core 20 can be any suitable material, and in the case of a wire or cable, is generally a metal or other conductor.

Figure 2:
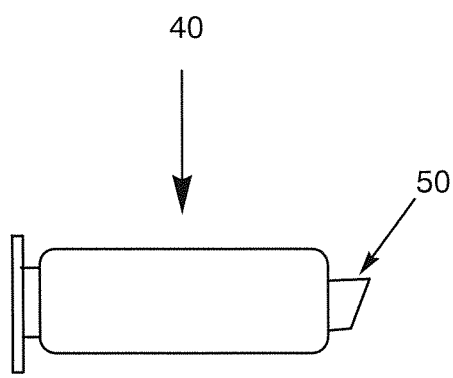
FIG. 2 is a perspective view of a molded component, namely a strain relief device comprising a composition of the present invention.

FIG. 2 illustrates one embodiment of a molded part 40 in the form of a strain relief device formed from a composition of the present invention that is utilized to reduce strain on a cable 50.

For the avoidance of doubt, the compositions of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of said components. Similarly, it is also to be understood that a description of a process comprising certain steps also discloses a process consisting of the steps.

EXAMPLES

The examples set forth below are provided to illustrate the features of the thermoplastic elastomer compositions of the present invention. The examples are not intended to limit the scope of the invention.

All of the materials before compounding were pre-mixed to a substantially uniform and free flowing state and were compounded using a twin-screw extruder. The extrusion temperature was 175-220° C. and the extruder screw speed was 200-450 RPM.

The following raw materials were utilized for the examples.

| | |
|---|---|
| SBC 1 | Kraton A1535 from Kraton |
| SBC 2 | Kraton G-1651 from Kraton |
| SBC 3 | Kraton G1645 from Kraton |
| Mineral Oil | Puretol PSO 550, white mineral oil from Petro-Canada |
| Liquid HFFR 1 | Amfine FP-600, Bisphenol A Diphenyl Phosphate from Amfine |
| Liquid HFFR 2 | Santicizer 141, 2-ethylhexyldiphenyl phosphate from Ferro |
| Liquid HFFR 3 | Santicizer 148, Isodecyl diphenyl phosphate from Ferro |
| Liquid HFFR 4 | Kronitex TXP, Trixylenyl Phosphate from Chemtura |
| Solid HFFR 1 | Amfine FP-2100J, Proprietary N/P Blend from Amfine |
| Solid HFFR 2 | Exolit OP 935, from Clariant |
| Solid HFFR 3 | JLS-PNA from JLS Chemical Inc. |
| Solid HFFR 4 | Sidstar T120U from Elkem |
| Solid HFFR 5 | Magnifin H-10, Magnesium Hydroxide from Albemarle Corporation |
| PP 1 | F008F, Fractional Melt PP from Braskem |
| PP 2 | D115A,12MI PP from Braskem |
| POE | Versify 2200 polyolefin elastomer from Dow Chemicals |
| EVA | Elvax 650Q, EVA from DuPont |
| Fusabond | Fusabond N-493 from DuPont |
| ZB | Charmax ZB400T, Zinc Borate from PAG Holdings Inc. |
| Nano Clay | Bentone 108, Nano clay from Elementic |
| Lube | Crodamide ER, Erucamide from Croda |
| Si MB 1 | Genioplast Pellet S, from Wacker |
| Grey CC | Grey Color Concentrate from Teknor Apex Color Company |
| AO/UV | AO/UV Package from Teknor Apex Color Company |

Following test protocols were used for testing.

| | | |
|---|---|---|
| Hardness (15 sec) | Shore A | ASTM D-2240 |
| Tensile Strength | Psi | ASTM D-412 |
| 50% Modulus | Psi | ASTM D-412 |
| 100% Modulus | Psi | ASTM D-412 |
| 300% Modulus | Psi | ASTM D-412 |
| Tensile Elongation | % | ASTM D-412 |
| UL 94 VB Test | V-0 Pass/Fail | UL 94 |
| Melt Flow Rate | g/10 min | ASTM D-1238 |
| Specific Gravity | g/cm3 | ASTM D-792 |

TABLE 1

Comparative Examples Based on Kraton G1651

| Example | | Comparative Example 1 | Comparative Example 2 | Comparative Example 3 |
|---|---|---|---|---|
| SBC 2 | | 100.00 | 100.00 | 100.00 |
| Mineral Oil | | 62.50 | 31.25 | |
| Liquid HFFR 1 | | 50.00 | 81.25 | 112.50 |
| Solid HFFR 1 | | 337.50 | 337.50 | 337.50 |
| PP 1 | | 60.00 | 60.00 | 60.00 |
| POE | | 112.50 | 112.50 | 112.50 |
| EVA | | 50.00 | 50.00 | 50.00 |
| Nano Clay | | 28.75 | 28.75 | 28.75 |
| Si MB | | 16.75 | 16.75 | 16.75 |
| Grey CC | | 24.70 | 24.70 | 24.70 |
| AO/UV | | 5.98 | 5.98 | 5.98 |
| Total PHR | | 848.68 | 848.68 | 848.68 |
| Extruded Tape | | Smooth, dry surface | Smooth, but sticky surface due to the leach of liquid FR | Smooth, more liquid FR bloom to surface, and tacky |
| UL 94 VB Test (1/24") | | V0 Fail | V0 Fail | V0 Pass |
| Sample Thickness | mm | 1.010 | 0.991 | 1.040 |
| Specific Gravity | | 1.170 | 1.150 | 1.200 |
| Melt Flow Rate (200° C./5000 g) | g/10 min | 6.3 | 8.0 | 9.6 |
| Stand Hardness (15 sec delayed) | A | 91.0 | 92.0 | 94.0 |
| Tensile Strength | psi | 1197 | 1195 | 969 |
| Tensile Modulus at 100% | psi | 520 | 578 | 577 |
| Tensile Elongation | % | 516 | 488 | 413 |

Table 1 presents three comparative examples utilizing conventional SEBS containing 30-33 wt. % styrene. Comparative Example 1 utilized mineral oil to obtain a smooth, dry surface, but the composition exhibited poor flame retardant performance. Comparative Example 2 illustrates that replacing half of the mineral oil with liquid flame retardant produces an extruded tape having a surface that became sticky due to the leaching of the phosphorous-containing liquid flame retardant, with the composition failing the indicated UL 94 VB test. Comparative Example 3 illustrates the mineral oil replaced with liquid flame retardant. This comparative example passes the UL 94 VB test, but the surface became very sticky and oily due to surface bloom of the liquid flame retardant.

TABLE 2

Comparative Examples Based on Kraton G1645

| Example | Comparative Example 4 | Comparative Example 5 |
|---|---|---|
| SBC 3 | 100.000 | 100.000 |
| Liquid HFFR 1 | 95.588 | 87.203 |
| Solid HFFR 1 | 290.440 | 264.965 |
| PP 1 | 60.000 | 60.000 |
| POE | 75.000 | 50.000 |
| EVA | 50.000 | 50.000 |
| Nano Clay | 24.265 | 22.135 |
| Si MB | 13.970 | 12.745 |

TABLE 2-continued

Comparative Examples Based on Kraton G1645

| Example | Comparative Example 4 | Comparative Example 5 |
|---|---|---|
| Grey CC | 21.323 | 19.453 |
| AO/UV | 4.703 | 4.295 |
| Total PHR | 735.288 | 670.795 |
| Extruded Tape | Severe liquid FR exudation during tape extrusion, not suitable for extrusion process | Severe liquid FR exudation during tape extrusion, not suitable for extrusion process |

Table 2 presents two additional comparative examples wherein it is shown that with the use of a styrenic block copolymer containing relatively high vinyl and low styrene content it is possible to make mineral oil free, halogen free, flame retardant thermoplastic elastomer compositions. However, the use of a phosphorous-containing liquid flame retardant resulted in severe liquid exudation of the liquid flame retardant.

TABLE 3

Example Set 1, Gray Colored HFFR TPE Based on Kraton A1535H

| Example | Comparative Example 1A | Example 1 | Example 2 |
|---|---|---|---|
| SBC 2 | 100.00 | | |
| SBC 1 | | 100.00 | 100.00 |
| Mineral Oil | 62.50 | 31.25 | |
| Liquid HFFR 1 | 50.00 | 81.25 | 112.50 |
| Solid HFFR 1 | 337.50 | 337.50 | 337.50 |
| PP 1 | 60.00 | 60.00 | 60.00 |
| POE | 112.50 | 112.50 | 112.50 |
| EVA | 50.00 | 50.00 | 50.00 |
| Nano Clay | 28.75 | 28.75 | 28.75 |
| Si MB | 16.75 | 16.75 | 16.75 |
| Grey CC | 24.70 | 24.70 | 24.70 |
| AO/UV | 5.98 | 5.98 | 5.98 |
| Total PHR | 848.68 | 848.68 | 848.68 |
| Extruded Tape | Smooth, dry surface | Smooth, dry surface | Very smooth, dry surface |
| UL 94 VB Test (1/24") | V0 Fail | V0 Fail | V0 Pass |
| Sample Thickness mm | 1.040 | 0.990 | 1.010 |
| UL 94 VB Test (1/16") | V1 Pass | V0 Pass | V0 Pass |

TABLE 3-continued

Example Set 1, Gray Colored HFFR TPE Based on Kraton A1535H

| Example | | Comparative Example 1A | Example 1 | Example 2 |
|---|---|---|---|---|
| Sample Thickness | mm | 1.340 | 1.370 | 1.390 |
| Specific Gravity | | 1.160 | 1.190 | 1.210 |
| Melt Flow Rate (200° C./5000g) | g/10 min | 5.1 | 5.9 | 14.7 |
| Stand Hardness (15 sec delayed) | A | 92.0 | 93.0 | 95.0 |
| Tensile Strength | psi | 1085 | 1055 | 1054 |
| Tensile Modulus at 100% | psi | 517 | 583 | 635 |
| Tensile Elongation | 0/0 | 480 | 416 | 392 |

Comparative Example 1A is a repeat test of Comparative Example 1 in Table 1. Table 3 shows that replacing a conventional styrenic block copolymer (Comparative Example 1A) with a relatively high styrene content styrenic block copolymer having styrene present within each block, and replacing half of the mineral oil with liquid flame retardant (Example 1) produces an extruded tape having a smooth and dry surface. The flame retardant performance is improved to pass the UL 94 VB test at 1/16" thickness with a VO rating. Replacing all of the mineral oil with liquid flame retardant further improves a flame retardant performance and Example 2 passes the UL 94 VB test at 1/24" thickness.

TABLE 4

Example Set 2, HFFR TPE Based on Kraton A1535H to better Define Low Oil with Superior Flame Retardancy

| Example | | Comparative Example 1B | Example 3 | Example 4 | Example 5 | Example 6 |
|---|---|---|---|---|---|---|
| SBC 2 | | 100.000 | | | | |
| SBC 1 | | | 100.000 | 100.000 | 100.000 | 100.000 |
| Mineral Oil | | 62.479 | 46.859 | 31.239 | 15.620 | |
| Liquid HFFR 1 | | 50.000 | 65.620 | 81.239 | 96.859 | 112.479 |
| Solid HFFR 1 | | 337.606 | 337.606 | 337.606 | 337.606 | 337.606 |
| PP 1 | | 60.017 | 60.017 | 60.017 | 60.017 | 60.017 |
| PEO | | 112.564 | 112.564 | 112.564 | 112.564 | 112.564 |
| EVA | | 50.000 | 50.000 | 50.000 | 50.000 | 50.000 |
| Nano Clay | | 28.778 | 28.778 | 28.778 | 28.778 | 28.778 |
| Si MB | | 16.723 | 16.723 | 16.723 | 16.723 | 16.723 |
| Grey CC | | 24.703 | 24.703 | 24.703 | 24.703 | 24.703 |
| AO/UV | | 6.027 | 6.027 | 6.027 | 6.027 | 6.027 |
| Total PHR | | 848.896 | 848.896 | 848.896 | 848.896 | 848.896 |
| Extruded Tape | | Smooth, dry surface | Smooth, dry surface | Smooth, dry surface | Smooth, dry surface | Smooth, dry surface |
| UL 94 VB Test (1/24") | | V0 Fail | V0 Fail | V1 Pass | V0 Pass | V0 Pass |
| Sample Thickness | mm | 1.010 | 1.010 | 1.010 | 1.040 | 1.040 |
| Total Flame Time | S | 72 | 63 | 49 | 17 | 10 |
| Specific Gravity | | 1.173 | 1.168 | 1.198 | 1.207 | 1.204 |
| Melt Flow Rate (200° C./10 kg) | g/10 min | 15.8 | 21.3 | 37.6 | 68.2 | 105.3 |
| Stand Hardness (15 sec delayed) | A | 91.0 | 92.0 | 93.0 | 93.0 | 94.0 |

TABLE 4-continued

Example Set 2, HFFR TPE Based on Kraton A1535H to better Define Low Oil with Superior Flame Retardancy

| Example | | Comparative Example 1B | Example 3 | Example 4 | Example 5 | Example 6 |
|---|---|---|---|---|---|---|
| Tensile Strength | Psi | 1134 | 1049 | 1047 | 1014 | 1025 |
| Tensile Modulus at 100% | Psi | 520 | 591 | 597 | 597 | 617 |
| Tensile Elongation | % | 484 | 417 | 411 | 391 | 385 |

Comparative Example 1B is a repeat of Comparative Example 1 in Table 1. Table 4 shows that as more and more mineral oil is replaced with liquid flame retardant, the flame retardant performance improves, while the surface remained smooth and dry.

TABLE 5

Example Set 3, Metal Hydrate HFFR TPE Based on Kraton A1535H

| Example | | Comparative Example 6 | Comparative Example 7 | Comparative Example 8 | Example 7 |
|---|---|---|---|---|---|
| SBC 2 | | 100.000 | | 100.000 | |
| SBC 1 | | | 100.000 | | 100.000 |
| Mineral Oil | | 62.497 | 62.497 | | |
| Liquid HFFR 1 | | | | 62.497 | 62.497 |
| Solid HFFR 5 | | 460.360 | 460.360 | 460.360 | 460.360 |
| PP 2 | | 52.081 | 52.081 | 52.081 | 52.081 |
| Fusabond | | 23.843 | 23.843 | 23.843 | 23.843 |
| ZB | | 48.634 | 48.634 | 48.634 | 48.634 |
| AO/UV | | 5.201 | 5.201 | 5.201 | 5.201 |
| Total PHR | | 752.615 | 752.615 | 752.615 | 752.615 |
| Extruded Tape | | Smooth, dry surface | Smooth, dry surface | Smooth, dry surface | Smooth, dry surface |
| UL 94 VB Test (1/8") | | V0 FAIL | V0 FAIL | V0 FAIL | V0 PASS |
| Sample Thickness | mm | 3.230 | 3.200 | 3.280 | 3.250 |
| Specific Gravity | | 1.547 | 1.566 | 1.616 | 1.643 |
| Melt Flow Rate (190° C./20,000 g) | g/10 min | 2.0 | 20.8 | 4.9 | 8.9 |
| Stand Hardness (15 sec delayed) | A | 93.6 | 93.7 | 96.1 | 95.6 |
| Tensile Strength | psi | 1628 | 1558 | 1288 | 1609 |
| Tensile Modulus at 100% | psi | 1370 | 1333 | 1140 | 1416 |
| Tensile Elongation | % | 217% | 209% | 160% | 172% |

Table 5 provides evidence that a styrenic block copolymer containing high styrene content with styrene present in each block and the use of a phosphorus-containing liquid flame retardant in combination with a solid halogen-free flame retardant imparts improved flame retardancy. Example 7 illustrates a passing UL 94 VB test of a composition including the metal hydrate and a liquid phosphorus containing flame retardant.

TABLE 6

Example Set 4, Evaluation of HFFR TPE Based on Kraton A1535H and a polyolefin

| Example | | Comparative Example 9 | Example 8 |
|---|---|---|---|
| SBC 2 | | 100.00 | |
| SBC 1 | | | 100.00 |
| Mineral Oil | | 54.99 | |
| Liquid HFFR 1 | | | 54.99 |
| Solid HFFR 1 | | 137.51 | 137.51 |
| PP 1 | | 58.74 | 58.74 |
| Nano Clay | | 12.50 | 12.50 |
| Lube | | 1.89 | 1.89 |
| AO/UV | | 5.42 | 5.42 |
| Total PHR | | 371.06 | 371.06 |
| Extruded Tape | | Smooth, dry surface | Smooth, dry surface |
| UL 94 VB Test (1/32") | | V0 Fail | V0 Pass |
| Sample Thickness | mm | 0.813 | 0.838 |
| Specific Gravity | | 1.111 | 1.205 |
| Melt Flow Rate (200° C./10 kg) | g/10 min | 43.2 | 52.8 |

TABLE 6-continued

Example Set 4, Evaluation of HFFR TPE Based on Kraton A1535H and a polyolefin

| Example | | Comparative Example 9 | Example 8 |
|---|---|---|---|
| Stand Hardness (15 sec delayed) | A | 87.4 | 94.3 |
| Tensile Strength | psi | 2313 | 1630 |
| Tensile Modulus at 100% | psi | 539 | 668 |
| Tensile Elongation | % | 576 | 413 |

Table 6 illustrates that softener, in particular mineral oil, free compositions can be provided utilizing the combination of preferred styrenic block copolymers, non-halogen flame retardants including a phosphorous-containing liquid and polymers other than EVA, wherein polypropylene is utilized in the Example 8.

TABLE 7

Example Set 5, metal Phosphinate Salt and Melamine Polyphosphate HFFRTPE Based on Kraton A1535H

| Example | | Comparative Example 10 | Example 9 |
|---|---|---|---|
| SBC 2 | | 100.00 | |
| SBC 1 | | | 100.00 |
| Mineral Oil | | 54.99 | |
| Liquid HFFR 1 | | | 54.99 |
| Solid HFFR 2 | | 87.31 | 87.31 |
| Solid HFFR 3 | | 44.16 | 44.16 |
| Solid HFFR 4 | | 18.55 | 18.55 |
| PP 1 | | 58.74 | 58.74 |
| Si MB | | 1.89 | 1.89 |
| AO/UV | | 5.42 | 5.42 |
| Total PHR | | 371.06 | 371.06 |
| Extruded Tape | | Smooth, dry surface | Smooth, dry surface |
| UL 94 VB Test (1/32") | | V0 Fail | V0 Pass |
| Sample Thickness | mm | 0.762 | 0.787 |
| Specific Gravity | | 1.076 | 1.159 |
| Melt Flow Rate (200° C./10 kg) | g/10 min | 45.0 | 40.3 |
| Stand Hardness (15 sec delayed) | A | 88.8 | 95.4 |
| Tensile Strength | psi | 1719 | 1328 |
| Tensile Modulus at 100% | psi | 558 | 745 |
| Tensile Elongation | % | 510 | 343 |

Table 7 provides example evidence that different flame retardant packages including the phosphorous-containing liquid can be utilized while still providing desired flame retardancy. The examples utilized a metal phosphinate salt in combination with melamine polyphosphate.

TABLE 8

Example Set 6, Additional Phosphate Esters in intumescent HFFR TPE Based on Kraton A1535H

| Example | | Comparative Example 9A | Example 8A | Example 10 | Example 11 | Example 12 |
|---|---|---|---|---|---|---|
| SBC 2 | | 100.00 | | | | |
| SBC 1 | | | 100.00 | 100.00 | 100.00 | 100.00 |
| Mineral Oil | | 54.99 | | | | |
| Liquid HFFR 1 | | | 54.99 | | | |
| Liquid HFFR 2 | | | | 54.99 | | |
| Liquid HFFR 3 | | | | | 54.99 | |
| Liquid HFFR 4 | | | | | | 54.99 |
| Solid HFFR 1 | | 137.51 | 137.51 | 137.51 | 137.51 | 137.51 |
| PP 1 | | 58.74 | 58.74 | 58.74 | 58.74 | 58.74 |
| Nano Clay | | 12.50 | 12.50 | 12.50 | 12.50 | 12.50 |
| Lube | | 1.89 | 1.89 | 1.89 | 1.89 | 1.89 |
| AO/UV | | 5.42 | 5.42 | 5.42 | 5.42 | 5.42 |
| Total PHR | | 371.06 | 371.06 | 371.06 | 371.06 | 371.06 |
| Extruded Tape | | Smooth, dry surface | Smooth, dry surface | Smooth, dry surface | Smooth, dry surface | Smooth, dry surface |
| UL 94 VB Test (1/32") | | V0 Fail | V0 Pass | V0 Pass | V0 Pass | V0 Pass |
| Sample Thickness | mm | 0.813 | 0.784 | 0.788 | 0.786 | 0.810 |
| Specific Gravity | | 1.100 | 1.217 | 1.185 | 1.180 | 1.180 |
| Stand Hardness (15 sec delayed) | A | 87.0 | 90.0 | 79.5 | 78.0 | 81.5 |
| Tensile Strength | psi | 2384 | 1702 | 1085 | 1216 | 1186 |
| Tensile Modulus at 100% | psi | 567 | 800 | 514 | 517 | 498 |
| Tensile Elongation | % | 583 | 394 | 563 | 552 | 546 |

Table 8 presents Comparative Example 9A which is a repeat of Comparative Example 9 in Table 6. Example 8A is a repeat of Example 8 in Table 6. Examples 10 through 12 show that different phosphorous-containing liquid flame retardants can be used to provide excellent flame retardancy. Passing UL 94 VB tests are achieved regardless of the phosphorous-containing liquid flame retardant utilized.

While in accordance with the patent statutes the best mode and preferred embodiment have been set forth, the scope of the invention is not limited thereto, but rather by the scope of the attached claims.

What is claimed is:

1. A flame retardant thermoplastic elastomer composition, comprising:
    A. a hydrogenated styrenic block copolymer having a styrene content of at least 38 wt. %, the styrenic block copolymer comprising at least three blocks with styrene being present within each block, wherein each end block of the styrenic block copolymer comprises greater than 50% by weight of styrene;
    B. a first non-halogen flame retardant that is a phosphorous-containing liquid at 23° C. and present in an amount from about 5 to about 35 wt. % based on the total weight of the composition;
    C. a second non-halogen flame retardant that is a solid at 23° C. and present in an amount greater than 10 wt % to about 65 wt. % based on the total weight of the composition; and
    D. an additional polymer, different than the hydrogenated styrenic block copolymer, in an amount from about 5 to about 65 wt. % based on the total weight of the composition,
    wherein the composition has less than 5 wt. % of a softener based on the total weight of the composition.

2. The composition according to claim 1, wherein the styrenic block copolymer comprises at least one controlled distribution or random distribution copolymer block having a conjugated diene and a mono alkenyl arene.

3. The composition according to claim 1, wherein the composition contains less than 3 wt. % of the softener.

4. The composition according to claim 3, wherein the composition is free of the softener.

5. The composition according to claim 1, wherein the phosphorous-containing flame retardant is a phosphate ester.

6. The composition according to claim 5, wherein the second solid non-halogen flame retardant is one or more of a phosphorous-containing flame retardant, nitrogen-containing flame retardant, metal hydroxide, metal hydrate, expandable graphite and organo-layered silicate, and wherein the second solid non-halogen flame retardant is present in an amount from about 15 to about 62 wt. % based on the total weight of the composition.

7. The composition according to claim 6, wherein the polymer comprises one or more of a polyolefin, polyphenylene oxide, a thermoplastic polyurethane, polyester, acrylonitrile-butadiene-styrene, polystyrene, acrylonitrile ethylene styrene (AES), and styrene acrylonitrile copolymer (SAN), and wherein the polymer is present in an amount from about 10 to about 40 wt. % based on the total weight of the composition.

8. The composition according to claim 5, wherein the styrenic block copolymer is present in an amount from about 5 to about 50 wt. % based on the total weight of the composition.

9. The composition according to claim 5, wherein the composition further includes a polar polymer comprising one or more of ethylene vinyl acetate, maleated polyolefin, maleated styrenic block copolymer, maleated EPDM, acrylic polymer, and maleic anhydride/olefin copolymer, and wherein the polar polymer is present in an amount from about 1 to about 10 wt. % based on the total weight of the composition.

10. The composition according to claim 6, wherein the composition further comprises a platelet filler comprising one or more of nanoclay, an organically modified clay, talc and mica in the amount of 0.5 to 5 wt. % based on the total weight of the composition.

11. The composition according to claim 5, wherein the composition further comprises one or more of an antioxidant; dispersant; filler; extender; lubricant; pigment; stabilizer; stearate; UV absorber; and rheological modifier.

12. The composition according to claim 1, wherein the composition passes the UL 94 VB flame test with a V0 rating at a thickness of 1/16" (1.5875 mm).

13. The composition according to claim 1, wherein the composition is halogen free.

14. An extruded or molded article comprising the composition according to claim 1.

15. The composition according to claim 1, wherein the styrenic block copolymer is a tri-block copolymer and wherein the styrene in the mid-block is arranged randomly or has a controlled distribution.

16. A wire or cable jacket comprising the composition according to claim 1.

* * * * *